(12) United States Patent
Bennett et al.

(10) Patent No.: US 7,900,204 B2
(45) Date of Patent: *Mar. 1, 2011

(54) INTERRUPT PROCESSING IN A LAYERED VIRTUALIZATION ARCHITECTURE

(76) Inventors: Steven M. Bennett, Hillsboro, OR (US); Andrew V. Anderson, Hillsboro, OR (US); Gilbert Neiger, Portland, OR (US); Dion Rodgers, Hillsboro, OR (US); Richard A. Uhlig, Hillsboro, OR (US); Lawrence O. Smith, Beaverton, OR (US); Barry E. Huntley, Hillsboro, OR (US)

(*) Notice: Subject to any disclaimer, the term of this patent is extended or adjusted under 35 U.S.C. 154(b) by 1308 days.

This patent is subject to a terminal disclaimer.

(21) Appl. No.: 11/323,374

(22) Filed: Dec. 30, 2005

(65) Prior Publication Data

US 2007/0157198 A1    Jul. 5, 2007

(51) Int. Cl.
G06F 9/455 (2006.01)
G06F 9/46 (2006.01)
G06F 7/38 (2006.01)

(52) U.S. Cl. .......................... 718/1; 718/100; 712/244

(58) Field of Classification Search ..................... 718/1; 712/244

See application file for complete search history.

(56) References Cited

U.S. PATENT DOCUMENTS

| | | | |
|---|---|---|---|
| 4,253,145 A * | 2/1981 | Goldberg | 703/21 |
| 6,633,942 B1 * | 10/2003 | Balasubramanian | 710/264 |
| 7,647,589 B1 * | 1/2010 | Dobrovolskiy et al. | 718/1 |
| 2004/0117539 A1 * | 6/2004 | Bennett et al. | 711/6 |
| 2004/0123288 A1 * | 6/2004 | Bennett et al. | 718/1 |
| 2004/0193394 A1 * | 9/2004 | Levit-Gurevich et al. | 703/22 |
| 2004/0268347 A1 * | 12/2004 | Knauerhase et al. | 718/1 |
| 2005/0060702 A1 * | 3/2005 | Bennett et al. | 718/1 |
| 2005/0060703 A1 * | 3/2005 | Bennett et al. | 718/1 |
| 2005/0071840 A1 * | 3/2005 | Neiger et al. | 718/1 |
| 2007/0050764 A1 * | 3/2007 | Traut | 718/1 |

* cited by examiner

Primary Examiner—Kenneth Tang
(74) Attorney, Agent, or Firm—Thomas R. Lane

(57) ABSTRACT

Embodiments of apparatuses, methods, and systems for processing interrupts in a layered virtualization architecture are disclosed. In one embodiment, an apparatus includes a recognition logic, window logic, and evaluation logic. The event logic is to recognize an interrupt request. The window logic is to determine whether an interrupt window is open. The evaluation logic is to determine whether to transfer control to one of at least two virtual machine monitors in response to the interrupt request if the interrupt window is open.

7 Claims, 3 Drawing Sheets

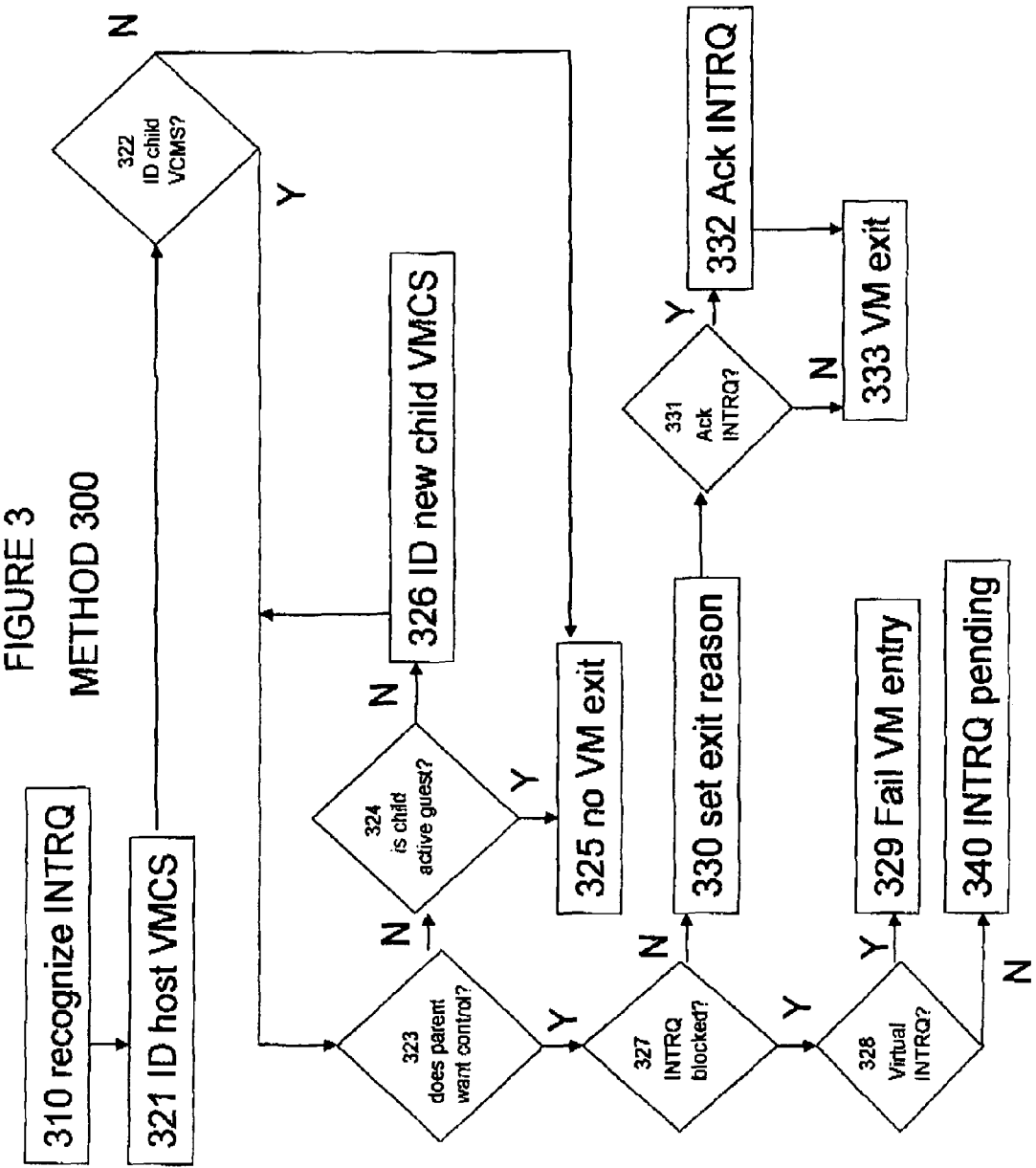

INTERRUPT PROCESSING IN A LAYERED VIRTUALIZATION ARCHITECTURE

BACKGROUND

1. Field

The present disclosure pertains to the field of data processing, and more particularly, to the field of virtualizing resources in data processing apparatuses.

2. Description of Related Art

Generally, the concept of virtualization of resources in data processing apparatuses allows multiple instances of one or more operating systems (each, an "OS") to run on a single data processing apparatus, even though each OS is designed to have complete, direct control over the apparatus and its resources. Virtualization is typically implemented by using software (e.g., a virtual machine monitor, or a "VMM") to present to each OS a "virtual machine" (a "VM") having virtual resources that the OS may completely and directly control, while the VMM maintains a system environment for implementing virtualization policies such as sharing and/or allocating the physical resources among the VMs (the "virtualization environment"). Each OS, and any other software, that runs on a VM, unaware of the virtualization environment, is referred to as a "guest" or as "guest software," while a "host" or "host software" is software, such as a VMM, that runs outside of, and may or may not be aware of, the virtualization environment.

A processor in a data processing apparatus may support virtualization, for example, by operating in two modes—a "root" mode in which software runs directly on the hardware, outside of any virtualization environment, and a "non-root" mode in which software runs at its intended privilege level, but within a virtualization environment hosted by a VMM running in root mode. In the virtualization environment, certain events, operations, and situations, such as external interrupts or attempts to access privileged registers or resources, may be "intercepted," i.e., cause the processor to exit the virtualization environment so that the VMM may operate, for example, to implement virtualization policies. The processor may support instructions for establishing, entering, exiting, and maintaining a virtualization environment, and may include register bits or other structures that indicate or control virtualization capabilities of the processor.

BRIEF DESCRIPTION OF THE FIGURES

The present invention is illustrated by way of example and not limitation in the accompanying figures.

FIG. 3 illustrates a method for processing interrupts according to an embodiment of the present invention.

DETAILED DESCRIPTION

Embodiments of apparatuses and methods for processing interrupts in a layered virtualization environment are described. In the following description, numerous specific details, such as component and system configurations, may be set forth in order to provide a more thorough understanding of the present invention. It will be appreciated, however, by one skilled in the art, that the invention may be practiced without such specific details. Additionally, some well known structures, circuits, and the like have not been shown in detail, to avoid unnecessarily obscuring the present invention.

Figure 1:
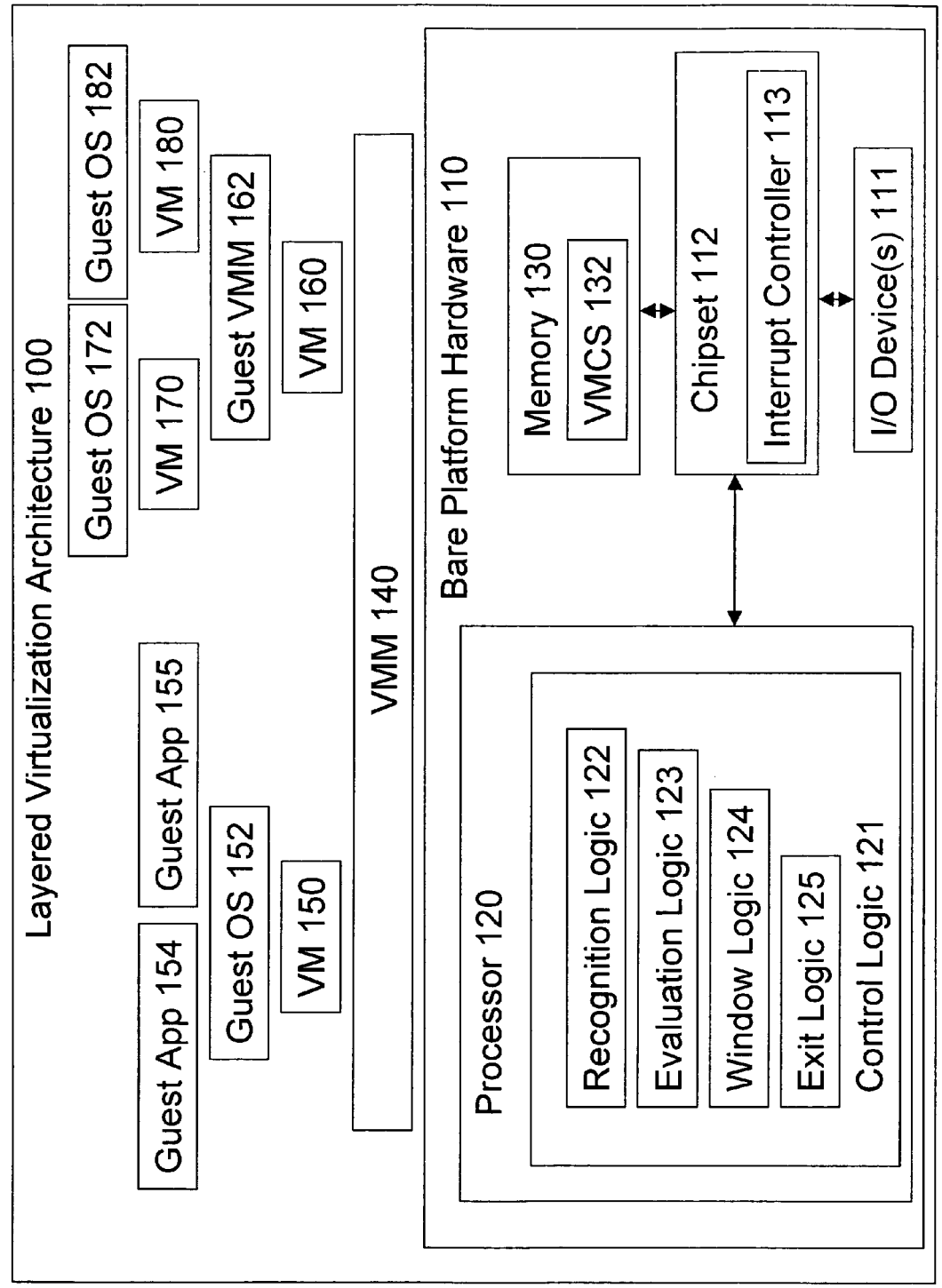
FIG. 1 illustrates a layered virtualization architecture in which an embodiment of the present invention may operate.

FIG. 1 illustrates layered virtualization architecture 100, in which an embodiment of the present invention may operate. In FIG. 1, bare platform hardware 110 may be any data processing apparatus capable of executing any OS or VMM software. For example, bare platform hardware may be that of a personal computer, mainframe computer, server, portable computer, handheld device, set-top box, or any other computing system. Bare platform hardware 110 includes processor 120, memory 130, input/output ("I/O") device 111, and chipset 112.

Processor 120 may be any type of processor, including a general purpose microprocessor, such as a processor in the Pentium® Processor Family, the Itanium® Processor Family, or other processor family from Intel Corporation, or another processor from another company, or a digital signal processor or microcontroller. Although FIG. 1 shows only one such processor 120, bare platform hardware 110 may include any number of processors. Processor 120 may include multiple threads or multiple cores in any combination.

Memory 130 may be static or dynamic random access memory, semiconductor-based read only or flash memory, magnetic or optical disk memory, any other type of medium readable by processor 120, or any combination of such mediums. I/O device(s) 111 may represent any number of peripheral or I/O devices, such as a monitor, a keyboard, a mouse, a printer, a network interface, an information storage device, etc. Chipset 112 may be include any number of components that perform any number of tasks, such as system logic, bus control, bus interfacing, bus bridging, memory control, peripheral device control, peripheral device functions, system configuration, etc. In FIG. 1, chipset 112 is shown to include interrupt controller 113, which may be any interrupt controller to manage interrupts according to any known approach, such as an approach including receiving interrupt requests, for example from I/O device 111, and sending them to processor 120.

Processor 120, memory 130, I/O device(s) 111, and chipset 112 may be coupled to or communicate with each other according to any known approach, such as directly or indirectly through one or more buses, point-to-point, or other wired or wireless connections. Bare platform hardware 110 may also include any number of additional devices or connections.

In addition to bare platform hardware 100, FIG. 1 illustrates VMM 140, VMs 150, 160, 170, and 180, and a number of guests.

VMM 140 may be any software, firmware, or hardware host installed to run on, or accessible to, bare platform hardware 110, to present VMs, i.e., abstractions of bare platform hardware 110, to guests, or to otherwise create VMs, manage VMs, and implement virtualization policies within a virtualization environment supported by virtualization architecture 100. In this embodiment, VMM 140 is a "root mode host" because it runs in root mode on processor 120. In other embodiments, a root mode host may be any monitor, hypervisor, OS, or other software, firmware, or hardware capable of controlling bare platform hardware 110.

A guest may be any OS, any VMM, including another instance of VMM 140, any hypervisor, or any application or other software. Each guest expects to access physical resources, such as processor and platform registers, memory, and I/O devices, of bare platform hardware 110, according to the architecture of the processor and the platform presented in the VM. FIG. 1 shows VMs 150, 160, 170, and 180, with guest OS 152 and guest applications 154 and 155 installed to run on VM 150, guest VMM 162 installed to run on VM 160, guest OS 172 installed to run on VM 170, and guest OS 182 installed to run on VM 180. In this embodiment, all guests run in non-root mode. Although FIG. 1 shows four VMs, four guest OSs, and six guest applications, any number of VMs may be created and any number of guest OSs and application may be installed to run on each VM within the scope of the present invention.

Virtualization architecture 100 is "layered" or "recursive" because it allows one VMM, for example, VMM 140, to host another VMM, for example, VMM 162, as a guest. In layered virtualization architecture 100, VMM 140 is the host of the virtualization environment including VMs 150 and 160, and is not a guest in any virtualization environment because it is installed to run on bare platform hardware 110 with no "intervening" monitor between it and bare platform hardware 110. An "intervening" monitor is a monitor, such as VMM 162, that hosts a guest, such as guest OS 172, but is also a guest itself. VMM 162 is the host of the virtualization environment including VMs 170 and 180, but is also a guest in the virtualization environment hosted by VMM 140. An intervening monitor (e.g., VMM 162) is referred to herein as a parent guest, because it may function as both a parent to another VM (or hierarchy of VMs) and as a guest of an underlying VMM (e.g., VMM 140 is a parent of VMM 162 which is a parent to guests 172 and 182).

A monitor, such as VMM 140, is referred to as the "parent" of a guest, such as OS 152, guest application 154, guest application 155, and guest VMM 162, if there are no intervening monitors between it and the guest. The guest is referred to as the "child" of that monitor. A guest may be both a child and a parent. For example, guest VMM 162 is a child of VMM 140 and the parent of guest OS 172 and guest OS 182.

A resource that can be accessed by a guest may either be classified as a "privileged" or a "non-privileged" resource. For a privileged resource, a host (e.g., VMM 140) facilitates the functionality desired by the guest while retaining ultimate control over the resource. Non-privileged resources do not need to be controlled by the host and may be accessed directly by a guest.

Furthermore, each guest OS expects to handle various events such as exceptions (e.g., page faults, and general protection faults), interrupts (e.g., hardware interrupts and software interrupts), and platform events (e.g., initialization and system management interrupts). These exceptions, interrupts, and platform events are referred to collectively and individually as "events" herein. Some of these events are "privileged" because they must be handled by a host to ensure proper operation of VMs, protection of the host from guests, and protection of guests from each other.

At any given time, processor 120 may be executing instructions from VMM 140 or any guest, thus VMM 140 or the guest may be active and running on, or in control of, processor 120. When a privileged event occurs or a guest attempts to access a privileged resource, control may be transferred from the guest to VMM 140. The transfer of control from a guest to a host is referred to as a "VM exit" herein. After handling the event or facilitating the access to the resource appropriately, VMM 140 may return control to a guest. The transfer of control from a host to a guest is referred to as a "VM entry" herein.

In addition to a VM exit transferring control from a guest to a root mode host, as described above, embodiments of the present invention also provide for a VM exit to transfer control from a guest to a non-root mode host, such as an intervening monitor.

In the embodiment of FIG. 1, processor 120 controls the operation of VMs according to data stored in virtual machine control structure ("VMCS") 132. VMCS 132 is a structure that may contain state of a guest or guests, state of VMM 140, execution control information indicating how VMM 140 is to control operation of a guest or guests, information regarding VM exits and VM entries, any other such information. Processor 120 reads information from VMCS 132 to determine the execution environment of a VM and constrain its behavior. In this embodiment, VMCS 132 is stored in memory 130. VMCS 132 may be divided into multiple structures, each corresponding to one host or one guest, where each may be considered an independent VMCS.

The "guest hierarchy" of a VMM is the stack of software installed to run within the virtualization environment or environments supported by the VMM. The present invention may be embodied in a virtualization architecture in which guest hierarchies include chains of pointers between VMCSs. These pointers are referred to as "parent pointers" when pointing from the VMCS of a child to the VMCS of a parent, and as "child pointers" when pointing from the VMCS of a parent to the VMCS of a child.

Figure 2:
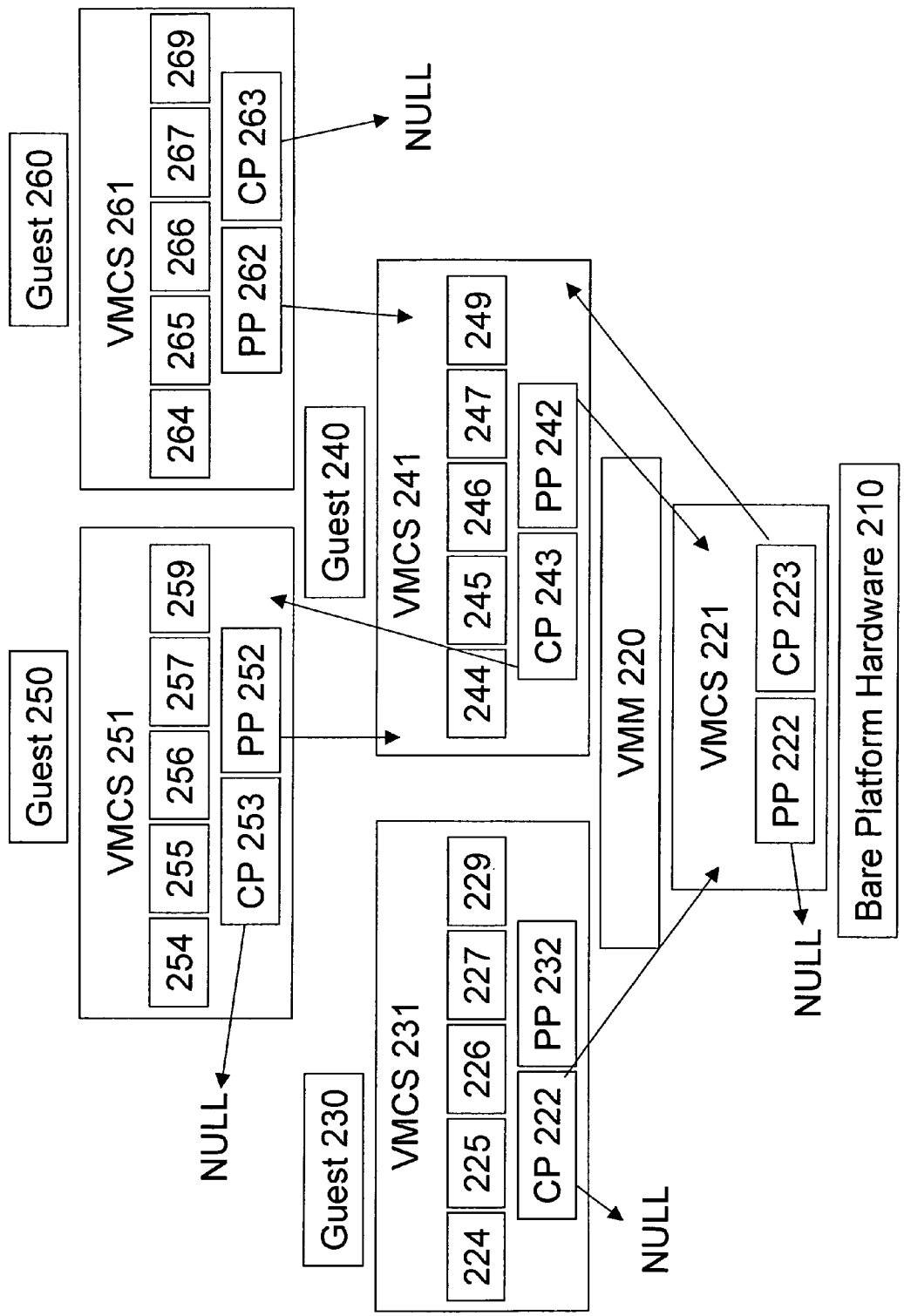
FIG. 2 illustrates the guest hierarchy of a VMM in a layered virtualization architecture.

FIG. 2 illustrates the guest hierarchy of VMM 220, which is installed as a root mode host on bare platform hardware 210. VMCS 221 is a control structure for VMM 220, although a root mode host may operate without a control structure. Guest 230 is a child of VMM 220, controlled by VMCS 231. Therefore, parent pointer ("PP") 232 points to VMCS 221. Guest 240 is also a child of VMM 220, controlled by VMCS 241. Therefore, parent pointer 242 also points to VMCS 221.

Guest 240 is itself a VMM, with two children, guests 250 and 260, each with a VMCS, 251 and 262, respectively. Both parent pointer 252 and parent pointer 262 point to VMCS 241.

The VMCS of a guest that is active, or running, is pointed to by the child pointer of its parent's VMCS. Therefore, FIG. 2 shows child pointer 243 pointing to VMCS 251 to indicate that guest 250 is active. Similarly, the VMCS of a guest with an active child pointer, as opposed to a null child pointer, is pointed to by the child pointer of its parent's VMCS. Therefore, FIG. 2 shows child pointer 223 pointing to VMCS 241. Consequently, a chain of parent pointers links the VMCS of an active guest through the VMCSs of any intervening monitors to the VMCS of a root mode host, and a chain of child pointers links the VMCS of a root mode host through the VMCSs of any intervening monitors to the VMCS of an active guest.

The VMCS 221 is referred to herein as the "root VMCS". In an embodiment, there is no root VMCS, as described above. In an embodiment which includes a root VMCS, the processing hardware may maintain a pointer to the root VMCS in an internal register or other data structure. The VMCS of a guest that is active, as described above, is referred to herein as the current controlling VMCS. For example, while guest 250 is active, VMCS 251 is the current controlling VMCS. In an embodiment, the processing hardware may maintain a pointer to the current controlling VMCS in an internal register or other data structure.

If a VMCS is not a parent VMCS, its child pointer, such as child pointers 233, 253, and 263, may be a null pointer. If a VMCS does not have a parent, for example, if it is a root-mode VMCS, its parent pointer, such as parent pointer 222, may be a null pointer. Alternatively, these pointers may be omitted. In some embodiments, the "null" value for a null VMCS pointer may be zero. In other embodiments, other values may be interpreted as "null". For example, in one embodiment with 32-bit addresses, the value 0xffffffff may be interpreted as null.

Each guest's VMCS in FIG. 2 includes a number of bits for information related to interrupt processing, although fields or any other information storage space or format may be used instead of bits.

For example, interrupt control bits 234, 244, 254, and 264 are to indicate whether the corresponding guest's parent wants control of an interrupt (e.g., if set, an interrupt request causes a VM exit). Also, interrupt blocking bits 235, 245, 255, and 265 are to indicate whether interrupt requests that would otherwise cause a VM exit are to be blocked (e.g., if this bit and the corresponding interrupt control bit is set, the interrupt request is blocked; if this bit is cleared and the corresponding interrupt control bit is set, the interrupt request causes a VM exit; if the corresponding interrupt control bit is cleared, this bit is ignored). Interrupt acknowledge bits 236, 246, 256, and 266 are to indicate whether the guest is to acknowledge an interrupt request before a VM exit is performed in response to the interrupt request (e.g., if set, the guest acknowledges an interrupt request before the VM exit).

Additionally, virtual interrupt pending bits 237, 247, 257, and 267 are to indicate whether there is a virtual interrupt pending. A virtual interrupt is a request for a VM exit to occur when there is an open interrupt window. An open interrupt window is a period during which the processor is interruptible. For example, from a guest's perspective, an interrupt window may be open when an interrupt blocking control bit (e.g., EFLAGS.IF in the architecture of the Pentium® Processor Family) is cleared, interrupt blocking instructions (e.g., MOV SS, POP SS, and STI in the architecture of the Pentium® Processor Family) are not being executed, and the processor is not in an activity state that naturally blocks interrupts (e.g., wait-for-SIPI or shutdown in the architecture of the Pentium® Processor Family). Therefore, when a virtual interrupt bit is set, a VM exit will occur at the beginning of any instruction when there is an open interrupt window.

Other examples of open interrupt windows may be from a host's perspective and from a guest hierarchy perspective. From a host's perspective, whether an interrupt window is open may depend on the value of a control bit in a VMCS. For example, a host may have an open interrupt window when the interrupt acknowledge bit in its guest's VMCS is set, and/or the interrupt blocking bit is cleared.

Each guest's VMCS in FIG. 2 also includes an exit reason field 239, 249, 259, or 269 to indicate the cause of a VM exit. Upon a VM exit, these fields may be used to store any of a number of values that correspond to reasons that the VM exit occurred.

The foregoing descriptions are of particular bits and fields to illustrate one embodiment. In other embodiments, each VMCS may include any number of such bits or other spaces to correspond to any number of different types of interrupts or any number of control or other options.

Returning to FIG. 1, processor 120 includes control logic 121 to support virtualization, including interrupt processing in a layered virtualization architecture. Control logic 121 may be implemented in microcode, programmable logic, hard-coded logic, or any other form of control logic within processor 120. In other embodiments, control logic 121 may be implemented in any form of hardware, software, or firmware, such as a processor abstraction layer, within a processor or within any device accessible or medium readable by a processor, such as memory 130.

Control logic 121 includes recognition logic 122, evaluation logic 123, window logic 124, and exit logic 125. Recognition logic 122 is to recognize interrupt requests. Evaluation logic 123 is to determine whether to transfer control to a VMM in response to an interrupt request. Window logic 124 is to determine whether an interrupt window (described above) is open. Exit logic 125 is to prepare for and cause a VM exit. Each of these logic units may also perform additional functions, including those described as being performed by another of the logic units, and any or all of these logic units may be integrated into a single logic unit.

Control logic 121 causes processor 120 to execute method embodiments of the present invention, such as the method embodiment illustrated in FIG. 3, for example, by causing processor 120 to include the execution of one or more micro-operations, e.g., to support virtualization, in its response to virtualization instructions, other instructions from a host or guest, or virtualization events.

FIG. 3 illustrates method 300 for processing interrupts according to an embodiment of the present invention. In box 310, recognition logic 122 recognizes an interrupt request, for example, from interrupt controller 113, I/O device 111, or interrupt controller 113 on behalf of I/O device 111. In this embodiment, recognition logic 122 may recognize the loading of guest's VMCS with a state that includes a pending interrupt, then transferring control to that guest through a VM entry ("vector-on-entry") as an interrupt request.

In boxes 321 to 333, evaluation logic 123 and window logic 124 determine if a VM exit is to occur in response to the interrupt request, and if so, which host is to receive control.

In box 321, the VMCS controlled by the host associated with the interrupt request is identified as the controlling VMCS. For example, if the interrupt request is generated by hardware, the VMCS controlling the root VMM (i.e., the root VMCS) may be identified as the controlling VMCS. In embodiments with no root VMCS, method 300 may be modified appropriately. Alternatively, if the interrupt request is induced or injected by a VMM, that VMM may be identified as the host and the VMCS of that VMM's immediate guest may be identified as the controlling VMCS.

In box 322, the child pointer of the controlling VMCS is followed to identify the child VMCS. If, in box 322, evaluation logic 123 determines that the identified child VMCS is not valid, for example, by determining that the child pointer is a null pointer, then no VM exit occurs and, in box 325, the active guest retains control and the interrupt request is handled according to the semantics of the virtual machine on which the guest is running (e.g., acknowledging the interrupt and vectoring to the interrupt handler if the virtual machine is in a state corresponding to an open interrupt window, end holding the interrupt request pending if the virtual machine is in a state corresponding to a closed interrupt window). If the interrupt request was the result of a vector-on-entry attempt and the interrupt window in the guest is closed, then the vector-on-entry attempt may be failed (i.e., the VM entry is not performed or results in an immediate return to the initiating VMM).

In box 323, evaluation logic 123 determines whether the parent (i.e., the VMM controlling the child VMCS) wants to regain control on the occurrence of an interrupt request, for example, by checking the child VMCS to determine if the interrupt control bit is set. If that parent does want control, then, in box 327, window logic 124 determines whether interrupts to that parent are blocked, for example, by checking the child VMCS to determine if the interrupt blocking bit is set.

If interrupts to that parent are blocked, then, in box 328, recognition logic 122 determines whether the interrupt request was injected by an underlying VMM (e.g., using the "vector-on-entry" mechanism). i.e., the interrupt is "virtual". If the interrupt request was injected by the setting of a virtual interrupt pending bit]] an underlying VMM, then, in box 329, the attempt to inject the interrupt is failed, e.g., by failing the VM entry that was injecting the interrupt. If the interrupt request was not injected by an underlying VMM, then no VM exit occurs, and in box 340, the interrupt request is held pending (i.e., the interrupt is not acknowledged and no vectoring to the interrupt handler occurs).

Returning to box 327, if interrupts to that parent are not blocked, then method 300 continues to box 330.

In boxes 330 to 333, exit logic 125 prepares for and causes a VM exit to that parent. For example, if the root mode host is identified as the parent in box 321, and there is a VM exit after only one pass through box 323, then the root mode host receives control.

In box 330, exit logic 125 reports the cause of the VM exit, for example, by storing a value representing a hardware interrupt in the exit reason field. In some embodiments, a value or values stored in the exit reason field(s) may include an indication of whether if the interrupt request was injected by an underlying VMM and/or any related or similar information.

For interrupt requests resulting from an underlying VMM's use of the vector-on-entry mechanism, box 330 may also include storing the guest state as if the VM entry succeeded (followed by an interrupt-induced VM exit), and information about the interrupt (e.g., the vector) may be stored in a VM-exit interrupt information field. In such a case, acknowledgement of the interrupt may not note any external activity (e.g., interrupt acknowledgement cycles on the processor bus). Rather, the acknowledgement of the interrupt may use interrupt vector or other interrupt information provided by the injecting VMM to facilitate the creation of appropriate VM exit information.

In box 331, a determination is made as to whether the guest is to acknowledge the interrupt request, for example, by checking the child VMCS to determine if the interrupt acknowledge bit is set. If so, the interrupt is acknowledged in box 332. In box 333, exit logic 127 causes the VM exit to occur and control is transferred to the parent.

Returning to box 323, if the determination is that the parent does not want control, then, in box 324, evaluation logic 123 determines whether the child is the active guest, for example, by determining if the child pointer of the child VMCS is a null pointer. If it is, then no VM exit occurs and, in box 325, the active guest retains control and the interrupt request is handled according to the semantics of the virtual machine on which the guest is running (e.g., acknowledging the interrupt and vectoring to the interrupt handler if the virtual machine is in a state corresponding to an open interrupt window, and holding the interrupt request pending if the virtual machine is in a state corresponding to a closed interrupt window). If the interrupt request was the result of a vector-on-entry attempt and the interrupt window in the guest is closed, then the vector-on-entry attempt may be failed (e.g., the VM entry is not performed or results in an immediate return to the initiating VMM).

If the determination in box 324 is that the child is not the active guest, then, in box 326, a new child VMCS is identified relative to the current child, for example, by following the child pointer within the VMCS. Then, box 323 is repeated.

Within the scope of the present invention, the method illustrated in FIGS. 3 and 4 may be performed in a different order, performed with illustrated boxes omitted, performed with additional boxes added, or performed with a combination of reordered, omitted, or additional boxes.

Some portions of the above descriptions have been presented in terms of algorithms and symbolic representations of operations on data bits within a computer system's registers or memory. These algorithmic descriptions and representations are the means used by those skilled in the data processing arts to effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It may have proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, it is to be appreciated that throughout the present invention, discussions utilizing terms such as "processing" or "computing" or "calculating" or "determining" or the like, may refer to the action and processes of a computer system, or similar electronic computing device, that manipulates and transforms data represented as physical (electronic) quantities within the computer system's registers and memories into other data similarly represented as physical quantities within the computer-system memories or registers or other such information storage, transmission or display devices.

Furthermore, processor 120, or any other component or portion of a component designed according to an embodiment of the present invention, may be designed in various stages, from creation to simulation to fabrication. Data representing a design may represent the design in a number of manners. First, as is useful in simulations, the hardware may be represented using a hardware description language or another functional description language. Additionally or alternatively, a circuit level model with logic and/or transistor gates may be produced at some stages of the design process. Furthermore, most designs, at some stage, reach a level where they may be modeled with data representing the physical placement of various devices. In the case where conventional semiconductor fabrication techniques are used, the data representing the device placement model may be the data specifying the presence or absence of various features on different mask layers for masks used to produce an integrated circuit.

In any representation of the design, the data may be stored in any form of a machine-readable medium. An optical or electrical wave modulated or otherwise generated to transmit such information, a memory, or a magnetic or optical storage medium, such as a disc, may be the machine-readable medium. Any of these media may "carry" or "indicate" the design, or other information used in an embodiment of the present invention, such as the instructions in an error recovery routine. When an electrical carrier wave indicating or carrying the information is transmitted, to the extent that copying, buffering, or re-transmission of the electrical signal is performed, a new copy is made. Thus, the actions of a communication provider or a network provider may constitute the making of copies of an article, e.g., a carrier wave, embodying techniques of the present invention.

Thus, apparatuses and methods for processing interrupts in a layered virtualization architecture have been disclosed. While certain embodiments have been described, and shown in the accompanying drawings, it is to be understood that such embodiments are merely illustrative and not restrictive of the broad invention, and that this invention not be limited to the specific constructions and arrangements shown and described, since various other modifications may occur to those ordinarily skilled in the art upon studying this disclosure. In an area of technology such as this, where growth is fast and further advancements are not easily foreseen, the disclosed embodiments may be readily modifiable in arrangement and detail as facilitated by enabling technological advancements without departing from the principles of the present disclosure or the scope of the accompanying claims.

What is claimed is:

1. An apparatus comprising:
a hardware processor associated with a computer system for processing virtual interrupts in a layered virtualization architecture with one or more intervening virtual machine monitors;
recognition logic that recognizes an interrupt request during execution of a virtual machine;
window logic that determines whether an interrupt window is open based on an interrupt blocking control bit, an interrupt blocking instruction, and an activity state that blocks interrupts;
evaluation logic that determines whether to transfer control of the apparatus to said one or more intervening virtual machine monitors in response to the interrupt request if the interrupt window is open, wherein determining which of said one or more intervening virtual machine monitors to transfer control occurs by following at least one pointer in a chain of pointers from a controlling virtual machine control structure to a child virtual machine control structure until an interrupt control bit is found to be set; and
exit logic that transfers control to the intervening virtual machine monitor if said window logic determines that the interrupt window is open and said evaluation logic determines to transfer control.

2. The apparatus of claim 1, wherein the recognition logic is to recognize the interrupt request caused by one of a peripheral device and a vector-on-entry attempt.

3. A method for processing virtual interrupts in a layered virtualization architecture with one or more intervening virtual machine monitors, the method comprising:
recognizing an interrupt request during execution of a virtual machine;
determining whether an interrupt window is open based on an interrupt blocking control bit, an interrupt blocking instruction, and an activity state that blocks interrupts;
determining whether to transfer control to said one or more intervening
virtual machine monitors in response to the interrupt request if the interrupt window is open;
determining which of said one or more intervening virtual machine monitors to transfer control occurs by following at least one pointer in a chain of pointers from a controlling virtual machine control structure to a child virtual machine control structure until an interrupt control bit is found to be set; and
transferring control to the determined intervening virtual machine monitor while the interrupt window is open.

4. The method of claim 3, further comprising generating the interrupt request by one of a peripheral device and attempting a vector-on-entry.

5. The method of claim 3, further comprising handling the interrupt request on the virtual machine on which the interrupt request was recognized if control is not transferred to one of the plurality of virtual machine monitors.

6. A system comprising:
a memory to store a plurality of control structures for a virtual machine; and
a processor for processing virtual interrupts in a layered virtualization architecture with one or more intervening virtual machine monitors, the processor including:
recognition logic that recognizes an interrupt request during execution of the virtual machine;
window logic that determines whether an interrupt window is open based on an interrupt blocking control bit, an interrupt blocking instruction, and an activity state; and
evaluation logic that determines whether to transfer control of the processor to said one or more intervening virtual machine monitors in response to the interrupt request if the interrupt window is open, wherein determining which of said one or more intervening virtual machine monitors to transfer control occurs by following at least one pointer in a chain of pointers from a controlling virtual machine control structure to a child virtual machine control structure until an interrupt control bit is found to be set; and
exit logic that transfers control to the intervening virtual machine monitor if said window logic determines that the interrupt window is open and said evaluation logic determines to transfer control.

7. The system of claim 6, further comprising a peripheral device, wherein the recognition logic is to recognize the interrupt request caused by one of a peripheral device, setting of a virtual interrupt pending indicator in the virtual machine control structure, and a vector-on-entry attempt.

* * * * *